United States Defensive Publication [19] (H) [11] T978,002

Messenger [43] Jan. 2, 1979

[54] TECHNIQUE FOR CEMENTING CASING IN DEVIATED BOREHOLES

[76] Inventor: Joseph U. Messenger, 2906 Gladiolus La., Dallas, Tex. 75233

[21] Appl. No.: 850,125

[22] Filed: Nov. 10, 1977

[51] Int. Cl.[2] ..... E21B 33/13

[52] U.S. Cl. ..... 166/311; 166/285

[57] ABSTRACT

This specification discloses a well completion method for deviated boreholes and in particular a schedule for placing wipers and centralizers along a casing string to be cemented in a deviated borehole to facilitate the reciprocation and cementing thereof in the borehole. A plurality of wipers spaced a first selected distance one from the other are positioned on a portion of the casing string to be located adjacent a zone of interest in the deviated portion of the borehole. A first plurality of centralizers are also positioned on the casing string on the portion to be located adjacent the zone of interest and a second plurality and a third plurality of centralizers are positioned on the casing string, respectively, below and above the zone of interest. The centralizers of the first, second and third pluralities are all spaced a second selected distance, one from the other. Above the third plurality of centralizers other centralizers are positioned on the casing string and the spacing thereof is increased in such a way as to provide for a gradual slope down of the casing string from the centralized portion of the borehole to the lower side thereof. Thereafter, the casing string is characterized by an absence of centralizers along the portion thereof which rests on the lower side of the deviated portion of the borehole. Centralizers are again located on the casing string through the transition from the deviated portion of the borehole to a vertical portion thereof.

4 Claims, 1 Sheet Drawing,

15 Pages Specification

The file of this unexamined application may be inspected and copies thereof may be purchased (849 O.G. 1221, Apr. 9, 1968).

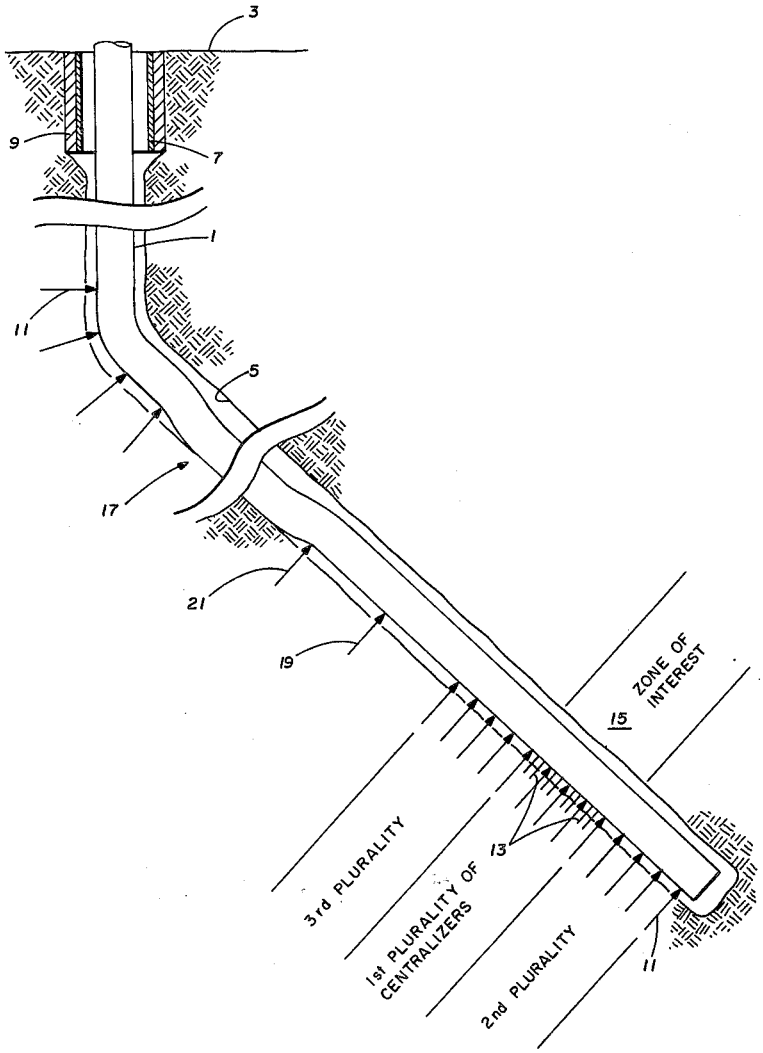

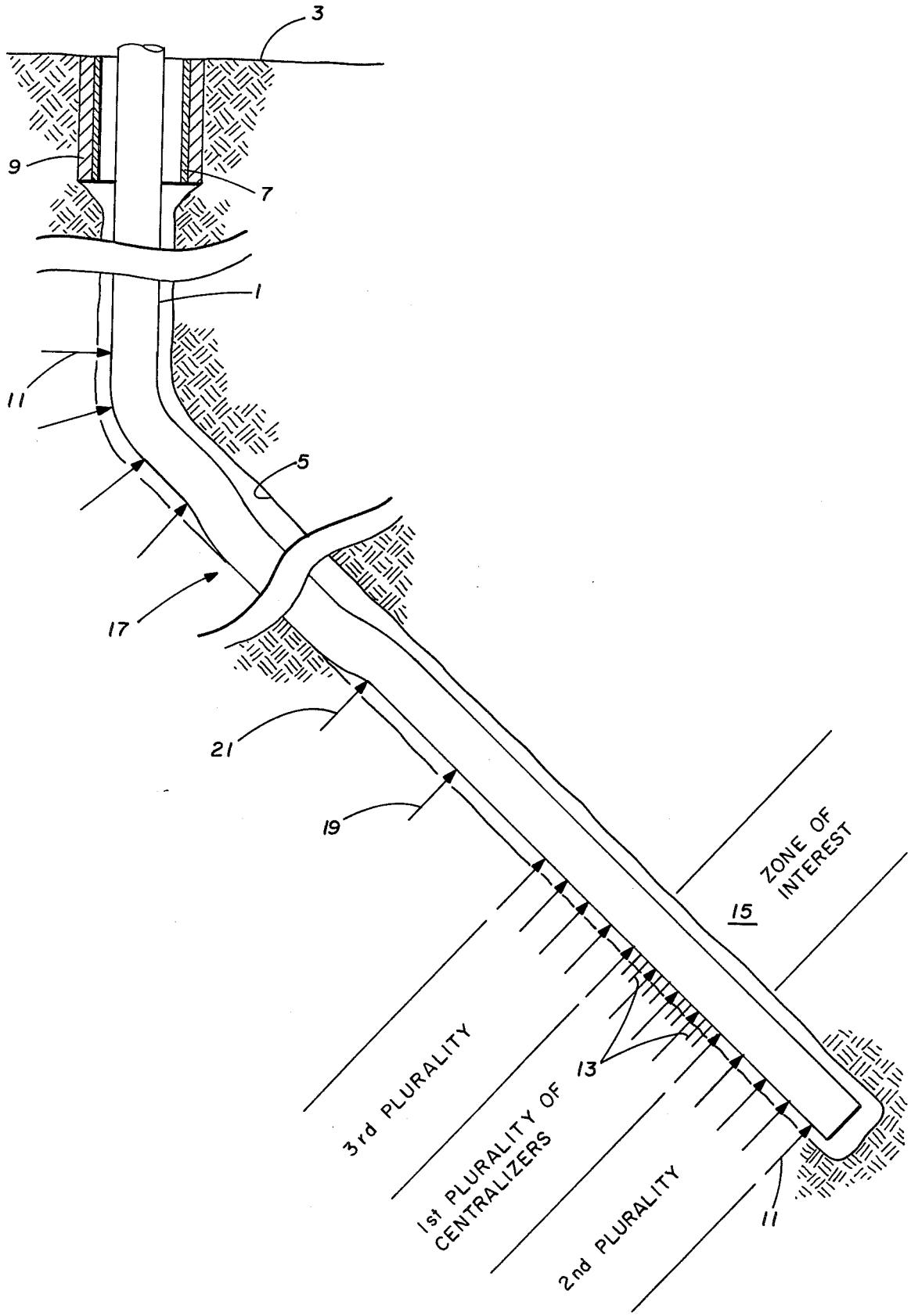
3
9
7
1
11
5
17
21
19
ZONE OF INTEREST
15
3rd PLURALITY
13
1st PLURALITY OF CENTRALIZERS
2nd PLURALITY
11